United States Patent [19]

Okuda et al.

[11] Patent Number: 4,992,742

[45] Date of Patent: Feb. 12, 1991

[54] CHARGED-PARTICLE DISTRIBUTION MEASURING APPARATUS

[75] Inventors: Soichiro Okuda; Shigeo Sasaki; Kazuo Yoshida; Yoshio Yamane; Fumiharu Yabunaka, all of Amagasaki, Japan

[73] Assignee: Mitsubishi Denki Kabushiki Kaisha, Japan

[21] Appl. No.: 436,664

[22] Filed: Nov. 15, 1989

[30] Foreign Application Priority Data

Dec. 22, 1988 [JP] Japan .................................. 63-327032
Apr. 13, 1989 [JP] Japan ..................................... 1-93717

[51] Int. Cl.$^5$ ............................................. G01N 27/00
[52] U.S. Cl. ................................... 324/71.3; 324/71.1
[58] Field of Search ..................... 324/71.3, 71.1, 452, 324/158 R; 250/397, 396 R

[56] References Cited

U.S. PATENT DOCUMENTS 4,724,324 2/1988 Liebert ................................. 324/71.3

FOREIGN PATENT DOCUMENTS 0965122 7/1964 United Kingdom ................. 324/71.3

OTHER PUBLICATIONS

Remnev, Sectioned Faraday cylinder, Instruments and Experimental Techniques, vol. 19, No. 3, pt. 1, pp. 637-639, May-Jun. 1976.
Nikkan Kogyou Shinbunsha, "Electron/Ion Beam Handbook", Sep. 25, 1986, p. 275.
J. G. Siekman "New Microprobe Techniques for Measuring the Current Distribution in an Electron Beam used for Weldin", pp. 391-395, 12-1974.
N. Natsuaki et al, "Spatial Dose Uniformity Monitor for Scanned Ion Beam", pp. 1300-1304, 5-1978.
E. P. EerNisse, "Ion Beam Profile Monitor", pp. 266-268, 3-1975.

Primary Examiner—Kenneth Wieder
Assistant Examiner—Jack B. Harvey
Attorney, Agent, or Firm—Leydig, Voit & Mayer

[57] ABSTRACT

A charged-particle distribution measuring apparatus includes a particle passing member having a plurality of through-holes through which portions of a beam of charged particles can pass, a particle trapping member for trapping charged particles that have passed through the through-holes, a recoil particle trapping member disposed between the particle passing member and the particle trapping member, and a mechanism for moving the members to measure the spatial distribution of the charged particle beam. Preferably, the through-holes in the particle passing member are uniformly distributed in a checkerboard pattern. The movement of the members permits measurement of the currents produced by the charged particle beam at various intervals between the locations of the through-holes at the beginning of the measurement. The measurement of the charged particle beam intensity at positions across through the beam, rather than at fixed locations within the beam, improves the resolution of the measured distribution. The apparatus can be employed with positively and negatively charged beams and is useful in ion implantation.

15 Claims, 9 Drawing Sheets

FIG. IA
PRIOR ART
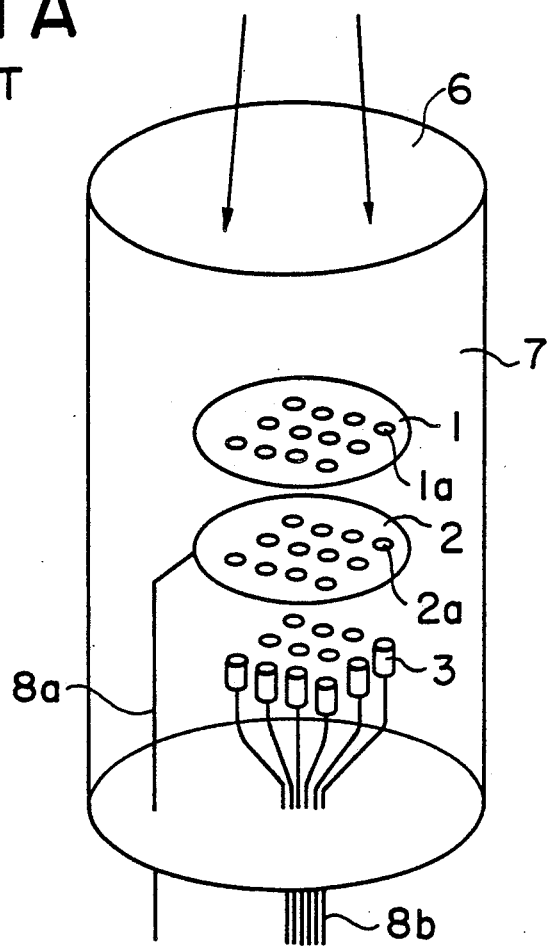
FIG. IB
PRIOR ART
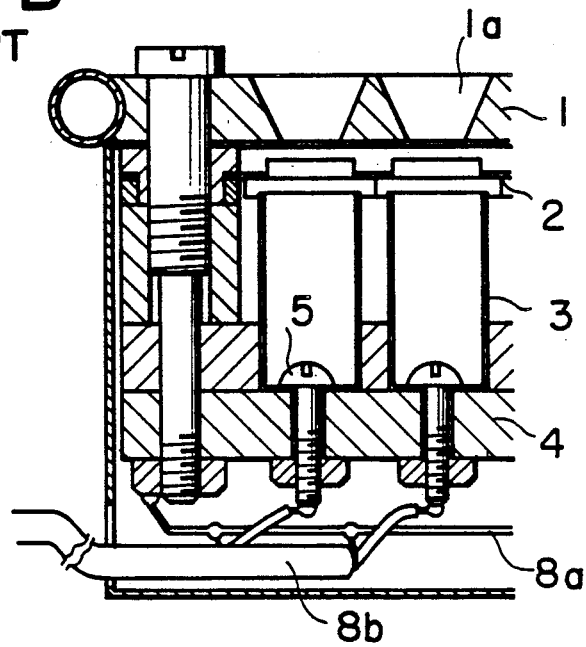

CHARGED-PARTICLE DISTRIBUTION MEASURING APPARATUS

BACKGROUND OF THE INVENTION

1. Field of the Invention

The present invention relates to a charged-particle distribution measuring apparatus for use in an ion mixing system, an ion implantation system or the like. More particularly, the present invention concerns a charged-particle distribution measuring apparatus which is capable of measuring the two-dimensional distribution of a large-current beam over a large area with a high resolution without deflecting the beam.

2. Description of the Related Art

In a large-current ion implantation over the large area of, for example, a semiconductor, it is essential to provide a uniform ion beam over the target area.

The current density distribution of this ion beam is conventionally measured by measuring the luminescence of a fluorescent material irradiated with the ion beam. However, this method has disadvantages in that highly accurate measurement is difficult and because the ion beam deteriorates and consumes the fluorescent material.

Another technique for measuring the current distribution in an electron beam is the wire beam probe method which has been proposed by, for example, J G Siekman et al "New Microphobe Techniques For Measuring The Current Distribution In An Electron Beam Used For Welding", Journal of Physics 1975 Vol. 8. In that method the current distribution in an ion beam is measured by measuring a current that flows in a thin metal wire while the wire is translated and rotated. However, in this method, secondary electrons are discharged from the metal wire during the ion radiation, limiting this ion current distribution measurement method to a relative current density distribution.

A charged-particle distribution measuring apparatus with a secondary electron restricting electrode incorporated therein so that it can measure the absolute quantity of an ion beam is also known. FIG. 1A is a schematic view of such a conventional charged-particle distribution measuring apparatus which is proposed in, for example, "Electron/Ion Beam Handbook" on page 275. FIG. 1B is a cross-sectional view of the beam current detection portion (hereinafter referred to as a Faraday cage) of that charged-particle distribution measuring apparatus. In this apparatus, an incident beam restricting plate 1, a secondary electron restricting electrode 2, and cylindrical collector electrodes 3 are accommodated in a vacuum vessel 7. The incident beam restricting plate (particle passing member) 1 has a plurality of through-holes 1a formed therein. The secondary electron restricting electrode (a recoil particle trapping member) 2 has the same number of through holes 2a as are in beam restricting plate 1. The through-holes 2a are aligned with the corresponding through-holes 1a. The cylindrical collector electrodes (particle trapping members) 3 are disposed behind the individual through-holes 1a and 2a. An insulating plate 4 defines the positional arrangement of the plurality of collector electrodes 3 while electrically isolating them from each other. The collector electrodes 3 are fixed to the insulating plate 4 by means of measuring terminal screws 5. A conductor 8a is connected to the secondary electron restricting electrode 2 so that a negative potential can be applied thereto from a power source (not shown). Measuring wires 8b are connected to the measuring terminal screws 5. The other ends of the measuring wires 8b are connected to a current measuring device (not shown).

The operation of the charged particle measuring apparatus arranged in the manner described above will be described below. When the incident beam restricting plate 1 is irradiated with a beam of charged particles 6 emitted from a charged particle source (not shown), some of the charged particles strike the incident beam restricting plate 1 and others pass through the through-holes 1a. The charged particles which have passed through the through-holes holes 1a also pass through the through-holes 2a formed in the secondary electron restricting electrode 2, and then strike the collector electrodes 3. The charged particles striking the collector electrodes 3 are measured by a current measuring device (not shown) located outside of the vacuum vessel 7 through the measuring terminal screws 5 and the measuring wires 8b. The current distribution in the charged particle beam 6 over the incident beam restricting plate 1 fixedly disposed in a two-dimensional plane is measured by measuring the current values of the individual collector electrodes 3 by ammeters and then comparing the values obtained.

The conventional charged-particle distribution measuring apparatus arranged in the manner described above has a disadvantage in that the resolution of the apparatus in the two-dimensional space is limited by the intervals between the adjacent holes formed in the incident beam restricting plate 1. It is impossible to improve the resolution because of the mechanical restrictions.

SUMMARY OF THE INVENTION

In view of the aforementioned problems of the prior art, an object of the present invention is to provide a charged-particle distribution measuring apparatus in which the two-dimensional resolution is improved and which has a simple structure.

To this end, the present invention provides a charged-particle distribution measuring apparatus which comprises: a particle passing member provided in a plane substantially perpendicular to the path of charged particles, the particle passing member having a plurality of through-holes formed therein; a particle trapping member for trapping the charged particles that have passed through the individual through-holes formed in the particle passing member; a recoil particle trapping member for trapping the charged particles that have recoiled from the particle trapping member; and means for moving the particle trapping portion in an arbitrary direction in the plane.

The present invention also provides a charged-particle distribution measuring method including the steps of irradiating a particle passing member having a plurality of through-holes with a beam of charged-particles, trapping the charged particles that have passed through the through-holes, trapping the charged particles that have recoiled from the particle trapping member by recoil particle trapping members, and comparing current values corresponding to the charged particles trapped by the individual recoiled particle trapping members to measure the distribution of the charged particles at the particle passing member. This charged-particle distribution measuring method includes moving a particle trapping portion, in an arbitrary direction in the plane of the particle passing portion during the measurement of the distribution in the charged particles.

BRIEF DESCRIPTION OF THE DRAWINGS

FIG. 1A is a schematic view of a conventional charged-particle distribution measuring apparatus;

FIG. 1B is a cross-sectional view of a Faraday cage in the apparatus of FIG. 1A;

DETAILED DESCRIPTION OF THE PREFERRED EMBODIMENTS

Figure 2:
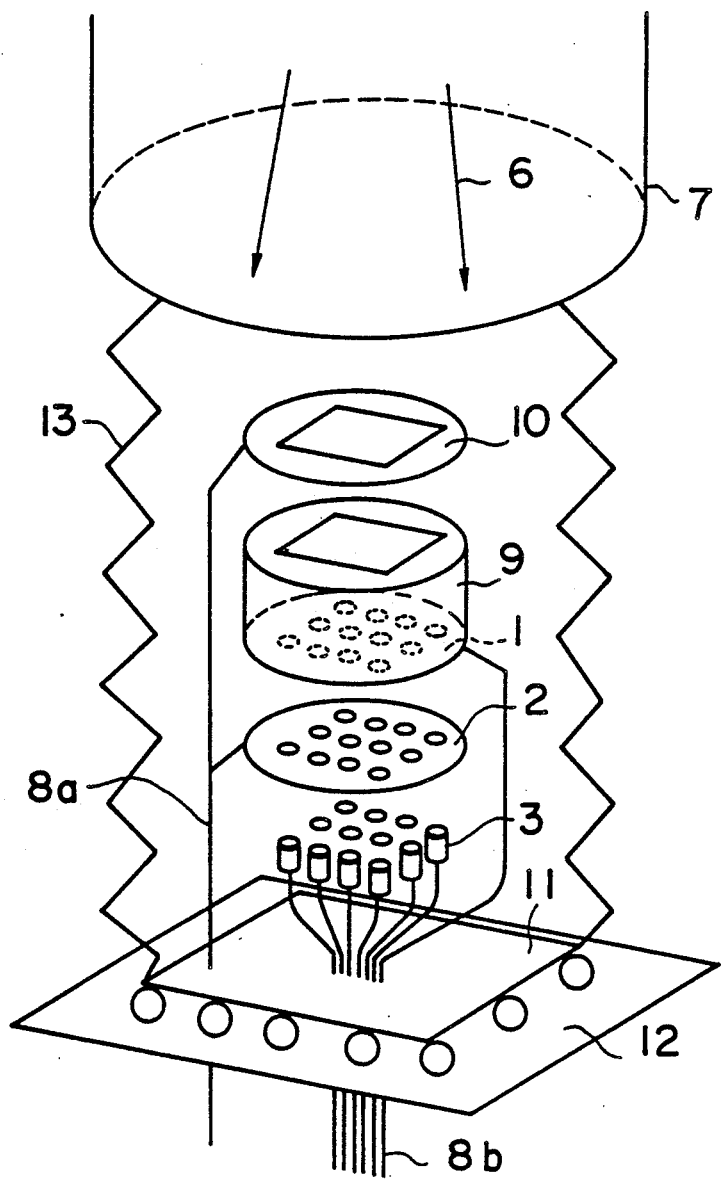
FIG. 2 is a schematic view of a charged-particle distribution measuring apparatus, showing a first embodiment of the present invention.

FIG. 2 shows a first embodiment of a charged particle distribution measuring apparatus according to the present invention, which may be used in an ion implantation system to measure the distribution of an ion beam current density. In FIG. 2, reference numerals 1 to 6 denote the parts which are the same as those in the conventional measuring apparatus shown in FIGS. 1A and 1B. A surrounding electrode 9 surrounds the incident beam restricting plate 1. The surrounding electrode 9 is electrically connected to the incident beam restricting plate 1. A second secondary electron restricting electrode 10 is disposed adjacent the incident beam restricting plate 1 and the surrounding electrode 9 and upstream thereof. A conductor 8a is connected to the second secondary electron restricting electrode 10 so that a negative voltage can be applied thereto. A particle trapping portion, including the incident beam restricting plate 1, the first secondary electron restricting electrode 2, the collector electrodes 3, the surrounding electrode 9 and the second secondary electron restricting electrode 10, is mounted on a movable mounting base 11 for moving in a plane perpendicular to the direction in which charged particles emitted from a charged particle source (not shown) pass, e.g., in two dimensions perpendicular to the direction in which the charged particles pass. The movable mounting base 11 is in turn placed on a base 12. The vacuum vessel 7 and the movable mounting base 11 are connected with each other through a flexible bellows 13 for blocking the entry of air therein. The second secondary electron restricting electrode 10 is electrically isolated from the surrounding electrode 9 by an insulating spacer 14 which is described in connection with FIG. 4.

Figure 3:
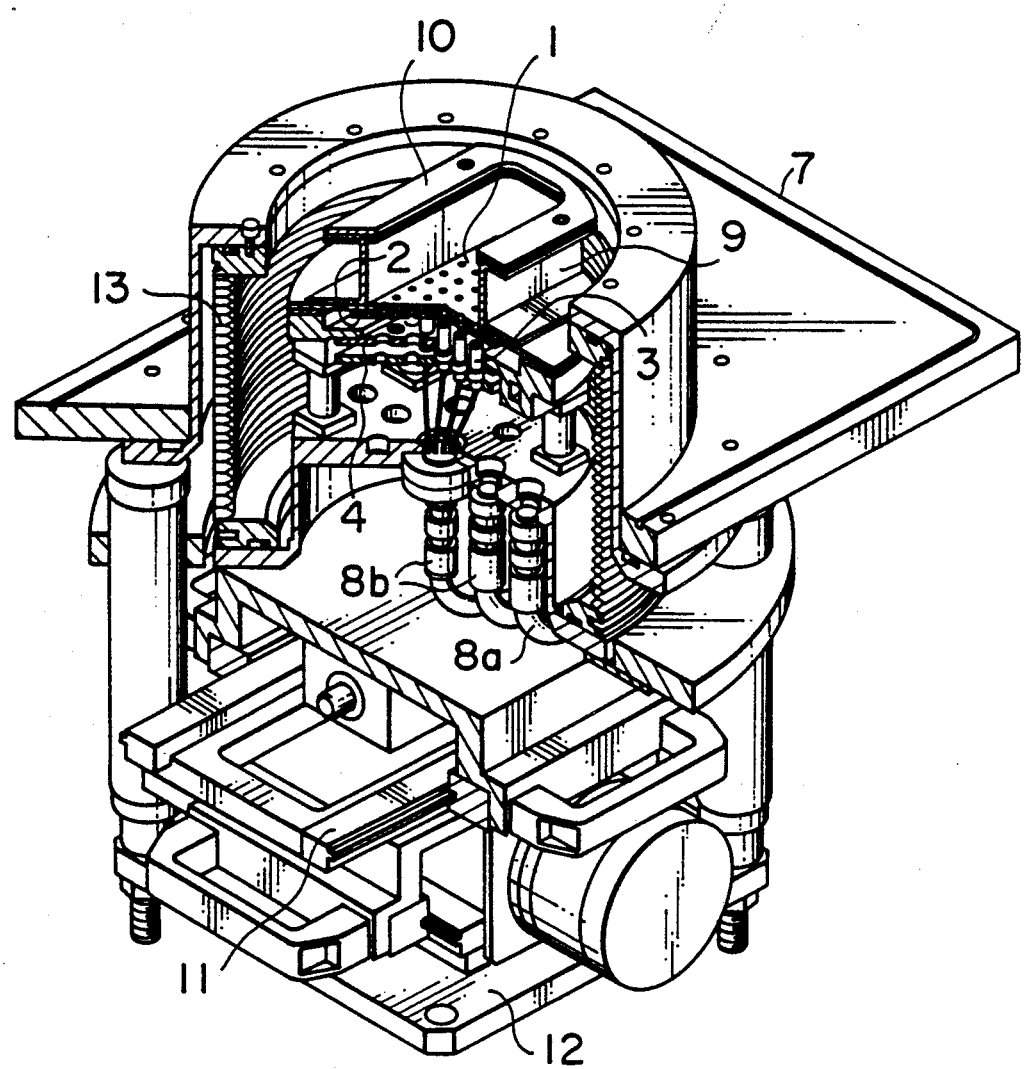
FIG. 3 is a perspective view of the apparatus of FIG. 2, with parts broken away.
Figure 4:
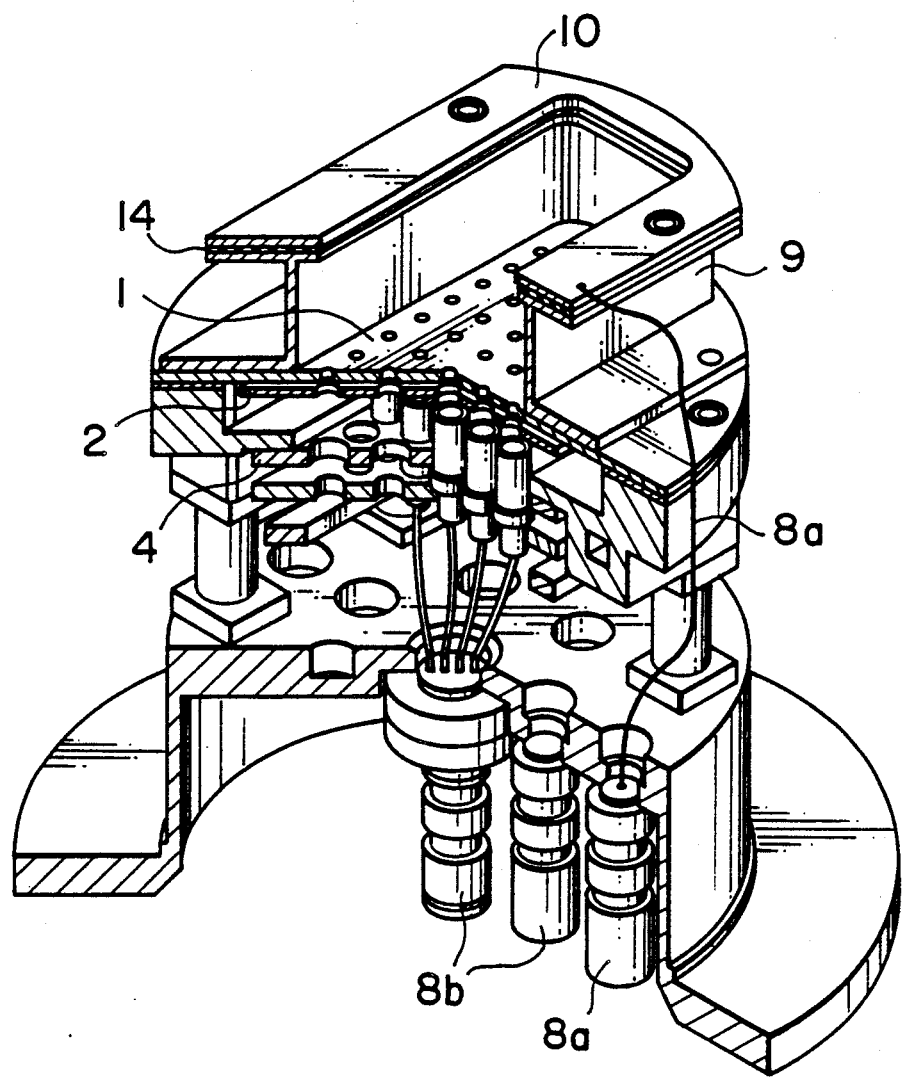
FIG. 4 is a perspective view of a Faraday cage in the apparatus of FIG. 3, with parts broken away.

FIG. 3 shows a practical form of the charged particle distribution measuring apparatus whose basic structure is shown in FIG. 2, and FIG. 4 is an enlarged view of a Faraday cage portion thereof.

Next, the operation of the above-described ion implantation system will be described below. When the incident beam restricting plate 1 is irradiated with the beam of charged particles 6 emitted from a charged particle source located above the incident beam restricting plate 1 as shown in FIG. 3, the charged particles strike the incident beam restricting plate 1 with the exception of those which pass through the through-holes 1a. The charged particles which have passed through the through-holes 1a also pass through the through-holes 2a formed in the first secondary electron restricting electrode 2, and then strike the collector electrodes 3. The charged particles striking the collector electrodes 3 are measured by a current measuring device (not shown) located outside of the vacuum vessel 7 through the measuring terminal bolts 5 and the measuring wires 8b. The current distribution in the charged particle beam 6 over the incident beam restricting plate 1 fixedly disposed in a two-dimensional plane is measured by comparing the current values of the individual collector electrodes 3 measured by the current measuring device. In this invention, the particle trapping portion can be moved by the movable mounting base 11. In consequence, the resolution is higher than that determined by the intervals between the adjacent through-holes 1a formed in the incident beam restricting plate 1. The improved resolution is obtained by moving the particle trapping portion sequentially through a plurality of intervals, each interval being smaller than the spacing between the adjacent holes 1a in the incident beam restricting plate 1. For example, it is assumed that the through-holes 1a having a diameter of 1 millimeter are formed in the incident beam restricting plate 1 with spacings of 10 millimeters in a checkerboard pattern. It is also assumed that the axis along which the through-holes 1a are aligned at intervals of 10 millimeters is the X axis, and that the axes perpendicular to the X axis are the Y and Z axes. The current distribution of the ion beam over the entire area can be measured with a resolution of 1 millimeter by moving the charged particle trapping portion sequentially in the intervals along the Y and Z axes 100 times, each interval being a distance of 1 millimeter.

The charged-particle distribution measuring apparatus described above has the following advantages.

(1) The movable mounting base 11 is moved, at the most, the distance between adjacent through-holes 1a in the incident beam restricting plate 1, reducing deformation of the flexible bellows 13.

(2) Since the particle trapping portion is moved within the bellows 13 without a sliding or rotating vacuum seal the degree of vacuum does not decrease during the movement, and the inside of the bellows 13 can be kept at a
high vacuum of, i.e., $10^{-6}$ Torr or less.

(3) When a toxic substance, such as As or P, is used in the semiconductor ion implantation process, it attaches to the individual portions of the charged particle distribution measuring apparatus, necessitating special safety precaution during maintenance. However, in the above-described measuring apparatus, since all the portions thereof except for those which are directly exposed to the toxic ion, such as the particle trapping portion, can be disposed in the atmosphere, no special safety precautions are necessary.

The overall current of the beam and distribution thereof can be measured concurrently by surrounding the incident beam restricting plate 1 by the surrounding electrode 9, by disposing the second secondary electron restricting electrode 10 in front of the surrounding electrode 9, and by connecting the incident beam restricting plate 1 to an ammeter, as in the above-described embodiment.

The above-described embodiment employs the bellows 13. However, in a case where a high degree of vacuum is not required, O-rings or other flexible sliding vacuum seals may be used.

Figure 5:
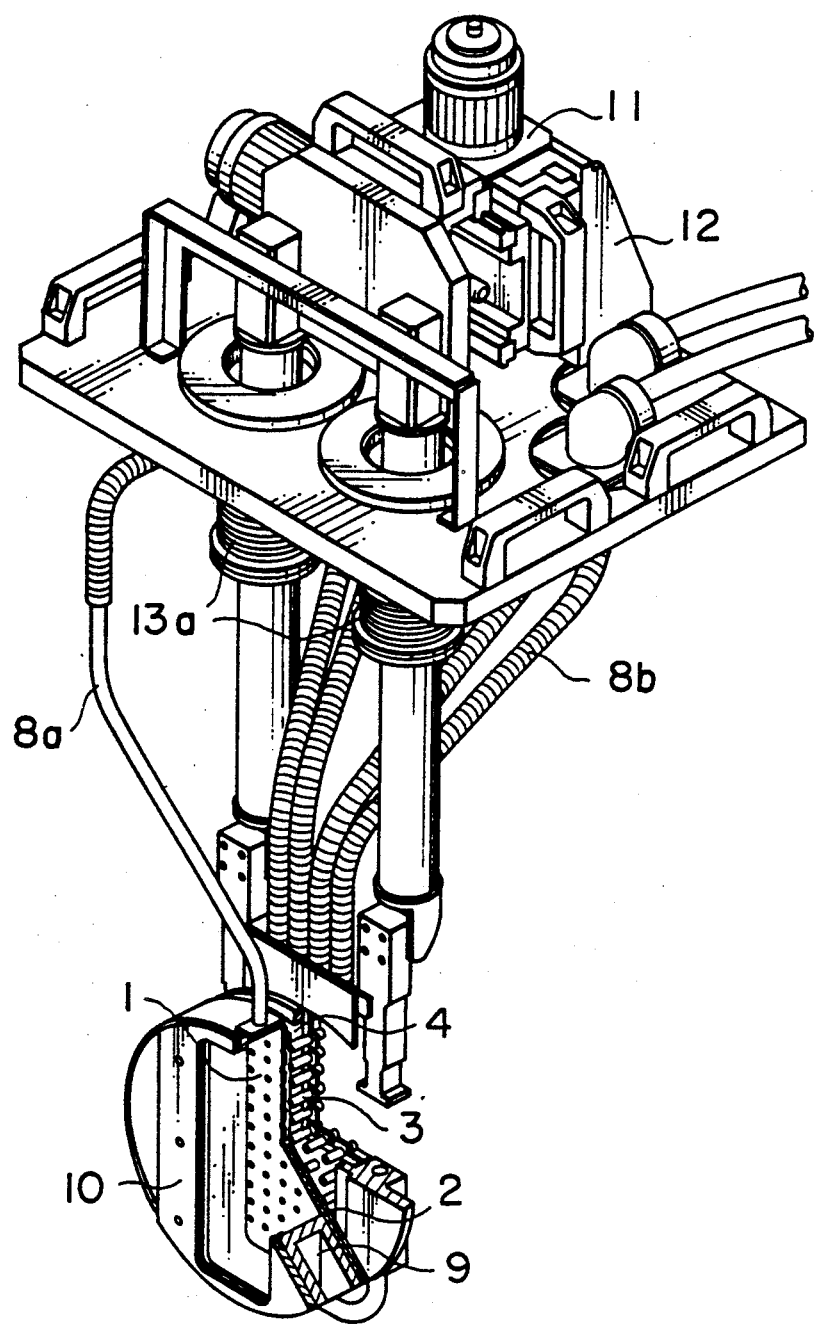
FIG. 5 is a perspective view of a charged-particle distribution measuring apparatus with parts broken away, showing a second embodiment of the present invention

The bellows 13 used in the above-described embodiment has a large cross-section. However, provision of at least one bellows 13a having a small cross-section, such as shown in FIG. 5, improves the flexibility of the bellows 13a. At the same time, exposure of the bellows 13a to the charged particle beam 6 is prevented.

Figure 6:
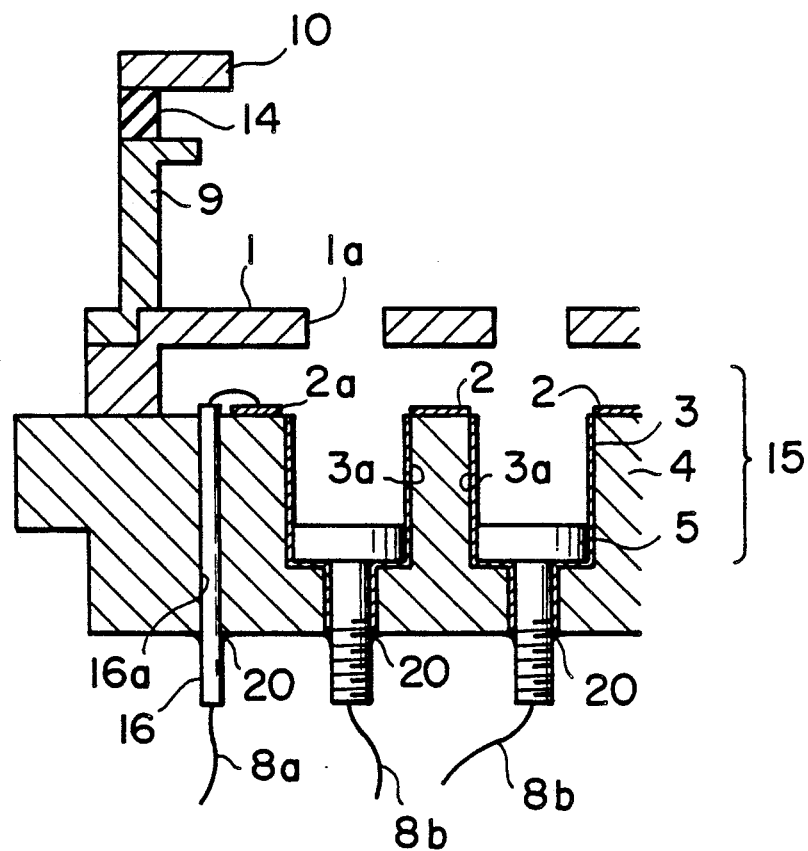
FIG. 6 is a cross-sectional view of a particle trapping portion of a charged-particle distribution measuring apparatus, showing a third embodiment of the present invention.
Figure 7:
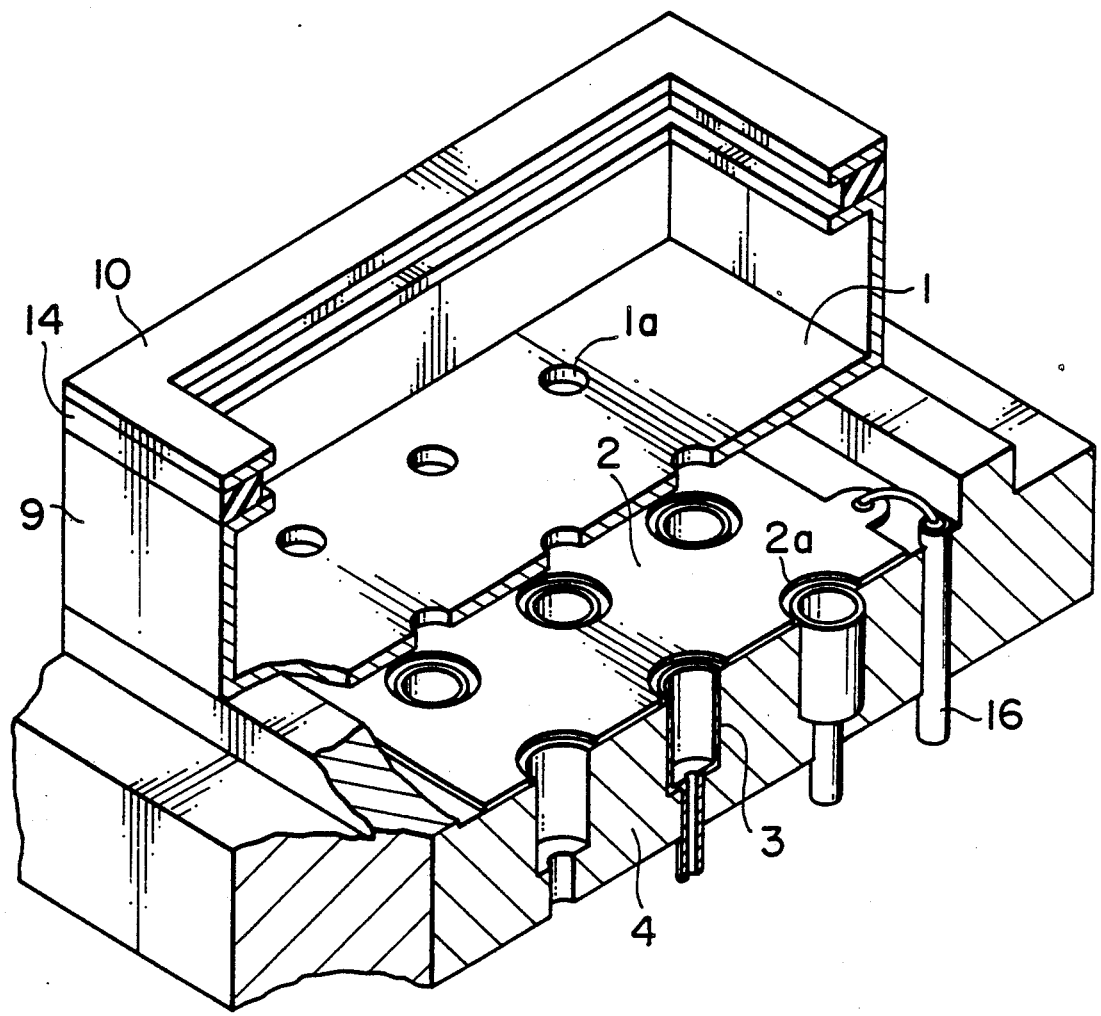
FIG. 7 is a partially sectioned perspective view of the apparatus of FIG. 6.

The measurement resolution may be further increased by using through-holes 1a having a smaller diameter in the incident beam restricting plate 1. More specifically, if the through-holes 1a each have a diameter of 0.2 millimeters and if the incident beam restricting plate 1 is moved at an interval of 0.2 millimeters, a resolution of 5 times as high as that obtained in the above-described embodiment can be obtained. FIGS. 6 and 7 are respectively cross-sectional and perspective views with parts cut away, showing this improved resolution. A charged particle distribution measuring apparatus of this embodiment includes a collector electrode plate 15 including the first secondary electron restricting electrode 2, the collector electrodes 3, the insulating plate 4 and the measuring terminal bolts 5, and secondary electron restricting electrode terminals 16.

The collector electrode plate 15 is manufactured by the following processes:

(1) Through-holes 3a for the collector electrodes 3 and those 16a for the secondary electron restricting electrode terminals 16 are cut into one surface of the insulating plate 4 made of a hard processed material, such as alumina, by means of an energy beam, such as an electron beam or a laser beam. A drill may be used if machine processing of the insulating plate 4 is possible. The minimum diameter of a hole formed by means of an energy beam or a drill is about 0.2 millimeters. Use of a beam or a drill ensures that the holes can be processed at highly accurate positions.

(2) The peripheral portion of each of the through-holes 3a for the collector electrodes 3 formed on one surface of the insulating plate 4 is masked with an annular mask, and the entire surface thereof is then metallized by vacuum deposition or the like. The thickness of the film deposited is from several $\mu$m to several tens of $\mu$m, with the function of the first secondary electron restricting electrode 2 and the bonding or brazing to be performed in a subsequent process taken into consideration.

(3) The portions of the insulating plate 4 which make contact with the measuring terminal bolts 5 are masked, and the other surface of the insulating plate 4 is then metallized in the same manner as in the above process (2).

(4) The measuring terminal bolts 5 and the second electron restricting electrode terminals 16 are respectively inserted into the through holes 3a and 16a formed in the insulating plate 4, and the bolts 5 and the terminals 16 inserted are then hermetically bonded to the insulating plate 4 by means of a solder 20 or the like.

(5) The conductors 8a and 8b are respectively bonded to the terminals 16 and the bolts 5 by wire bonding, soldering or the like. Alternatively, both the measuring terminal bolts 5 and the secondary electron restricting electrode terminals 16 may have a multiple pin structure, which are connected using connectors.

Figure 8:
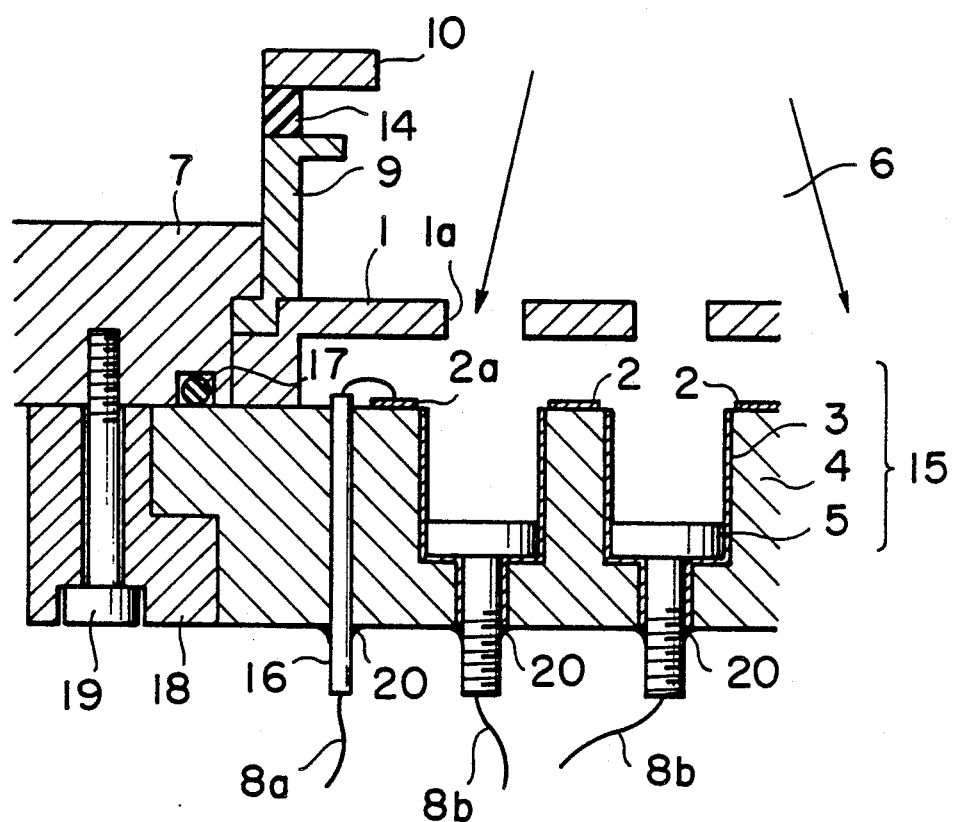
FIG. 8 is a cross-sectional view of the particle trapping portion of FIG. 6 which is in an assembled state.
Figure 9:
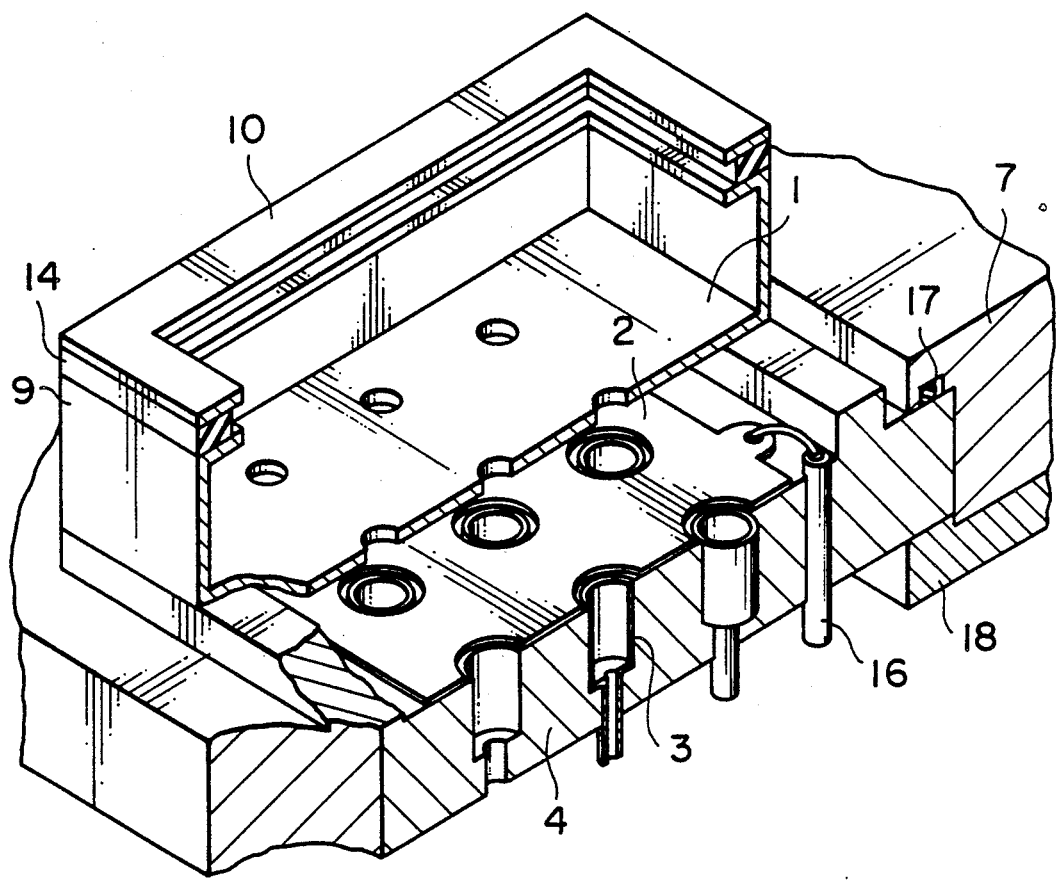
FIG. 9 is a partially sectioned perspective view of the apparatus of FIG. 8.

As stated above, the resolution of the measurement can be further increased by employing the collector electrode plate 16 manufactured by the above-described processes. In this collector electrode plate 15, since through-holes having a small diameter can be formed, they may be formed at intervals of about 5 millimeters. Hence, if a high resolution is not necessary, the collector electrode plate 15 may be fixedly mounted. FIGS. 8 and 9 are respectively a cross-sectional view and a perspective view with parts broken away, showing such an example. After the collector electrode plate 15, the incident beam restricting plate 1, the surrounding electrode 9, the insulating spacer 14 and the second secondary electron restricting electrode 10 have been assembled, the collector electrode plate 15 is mounted on the vacuum vessel 7 by means of clamping bolts 19, a gasket 17, and a flange 18.

The above-described embodiments exemplify the charged-particle distribution measuring apparatus which employs an ion beam. However, the present invention can also be applied to a charged-particle distribution measuring apparatus of the type which employs an electron beam.

What is claimed is:

1. A charged-particle distribution measuring apparatus comprising:
    a particle passing member including a plurality of through-holes disposed substantially perpendicular to the path of a beam of charged particles;
    a particle trapping member for trapping the charged particles that have passed through said through-holes in said particle passing member;
    a recoil particle trapping member disposed between said particle passing member and said particle trapping ember for trapping the charged particles that have recoiled from said particle trapping member; and
    means for moving said particle passing, particle trapping, and recoil particle trapping members in a plane generally perpendicular to the path of the beam of charged particles.

2. A charged-particle distribution measuring apparatus according to claim 1 wherein the through-holes are uniformly spaced from the nearest neighboring through-holes and said means for moving includes means for moving said members sequentially through intervals smaller than the uniform spacing between neighboring through-holes in said particle passing member.

3. A charged-particle distribution measuring apparatus according to claim 1 including an electrically insulating member on which said particle trapping member and said recoil particle trapping member are mounted.

4. A charged-particle distribution measuring apparatus according to claim 1 wherein said particle passing member is an incident beam restricting plate including said plurality of through-holes.

5. A charged-particle distribution measuring apparatus according to claim 1 wherein said recoil particle trapping member includes a plurality of through-holes respectively aligned with the through-holes in said particle passing member.

6. A charged-particle distribution measuring apparatus according to claim 1 wherein said particle trapping member includes a plurality of collector electrodes.

7. A charged-particle distribution measuring apparatus according to claim 1 including a flexible bellows enclosing said particle passing member, said particle trapping member, and said recoil particle trapping member and attached to said means for moving so as to maintain said members in a vacuum during movement by said means for moving.

8. A charged-particle distribution measuring apparatus according to claim 1 including a flexible vacuum seal attached to said means for moving for maintaining said members in a vacuum during movement by said means for moving.

9. A charged-particle distribution measuring apparatus according to claim 1 wherein said particle passing member includes a surrounding electrode.

10. A charged-particle distribution measuring apparatus according to claim 9 further including a second particle trapping member disposed up-stream relative to the beam of said surrounding electrode.

11. A charged-particle distribution measuring apparatus according to claim 1 wherein said charged particles are an ion beam.

12. A charged-particle distribution measuring apparatus according to claim 1 wherein said charged particles are an electron beam.

13. A charged-particle distribution measuring method comprising:
   irradiating a particle passing member having a plurality of through-holes with a beam of charged-particles;
   trapping charged particles that have passed through said through-holes in one of a plurality of particle trapping members;
   trapping charged particles that have recoiled from one of said particle trapping members in a recoil particle trapping member;
   measuring and comparing the electrical currents corresponding to the charged particles trapped by the respective particle trapping members; and
   moving said particle passing member, said particle trapping member, and said recoil particle trapping member sequentially through a plurality of intervals and measuring and comparing the electrical currents at each interval to determine the distribution in the charged particles.

14. A charged-particle distribution measuring method according to claim 13 wherein the through-holes are uniformly spaced from the nearest neighboring through-holes including moving the members through intervals smaller than the uniform spacing between said through-holes formed in said particle passing member.

15. A charged-particle distribution measuring method according to claim 13 including maintaining the members in a vacuum during the measuring, comparing, and moving steps.

* * * * *